United States Patent
Mizutani

[11] Patent Number: 6,115,786
[45] Date of Patent: *Sep. 5, 2000

[54] METHOD FOR CONTROLLING DISK MEMORY DEVICES FOR USE IN VIDEO ON DEMAND SYSTEM

[75] Inventor: Masami Mizutani, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/802,883

[22] Filed: Feb. 19, 1997

[30] Foreign Application Priority Data

Sep. 12, 1996 [JP] Japan ................................ 8-241474

[51] Int. Cl.⁷ .................................................. G06F 12/00
[52] U.S. Cl. .......................... 711/111; 711/112; 711/114; 711/167; 348/7
[58] Field of Search ................................ 348/7; 711/114, 711/118, 112, 167, 154; 395/200.49; 709/231, 217; 710/117

[56] References Cited

U.S. PATENT DOCUMENTS

| | | | |
|---|---|---|---|
| 5,365,381 | 11/1994 | Scheffler | 360/15 |
| 5,519,435 | 5/1996 | Anderson | 348/8 |
| 5,521,630 | 5/1996 | Chen et al. | 348/7 |
| 5,553,005 | 9/1996 | Voeten et al. | 711/112 |
| 5,586,264 | 12/1996 | Belknap et al. | 395/200.08 |
| 5,606,359 | 2/1997 | Youden et al. | 348/7 |
| 5,612,790 | 3/1997 | Sakamoto et al. | 386/69 |
| 5,671,377 | 9/1997 | Bleidt et al. | 395/328 |
| 5,732,217 | 3/1998 | Emura | 395/200.49 |
| 5,737,747 | 4/1998 | Vishlitzki et al. | 711/118 |
| 5,764,893 | 6/1998 | Okamoto et al. | 709/231 |
| 5,815,662 | 9/1998 | Ong | 709/217 |
| 5,838,362 | 11/1998 | Furuya et al. | 348/7 |
| 5,940,865 | 8/1999 | Ohzora et al. | 711/167 |
| 5,956,321 | 9/1999 | Yao et al. | 370/230 |

FOREIGN PATENT DOCUMENTS

| | | |
|---|---|---|
| 1-151070 | 6/1989 | Japan . |
| 3-6728 | 1/1991 | Japan . |
| 0306728 | 10/1991 | Japan . |
| 7-284066 | 10/1995 | Japan . |
| 7-303231 | 11/1995 | Japan . |

*Primary Examiner*—John W. Cabeca
*Assistant Examiner*—Pierre-Michel Bataille
*Attorney, Agent, or Firm*—Staas & Halsey

[57] ABSTRACT

A disk memory controlling system and a method for controlling disk memory devices for use in a Video On Demand system is provided so that delay caused in time intervals of reading when a single buffer is employed may be avoided, and the number of users who can be served program data may not decrease. The disk memory controlling system may include a plurality of disk memory devices, each of which is assigned a time slot to store separately divided data of a program; a buffer memory for storing data read out from the plurality of disk memory devices; and a controller for counting an estimated period equivalent to a period during which a transmission bus connected to the disk memory devices to be occupied for reading out data for the "i"th time slot, when the "i"th time slot is assigned to no user, while the "i+1"th time slot is assigned to a user; and controlling to read out from the disk memory devices, data for the "i+1"th time slot, after the estimated period has passed.

6 Claims, 12 Drawing Sheets

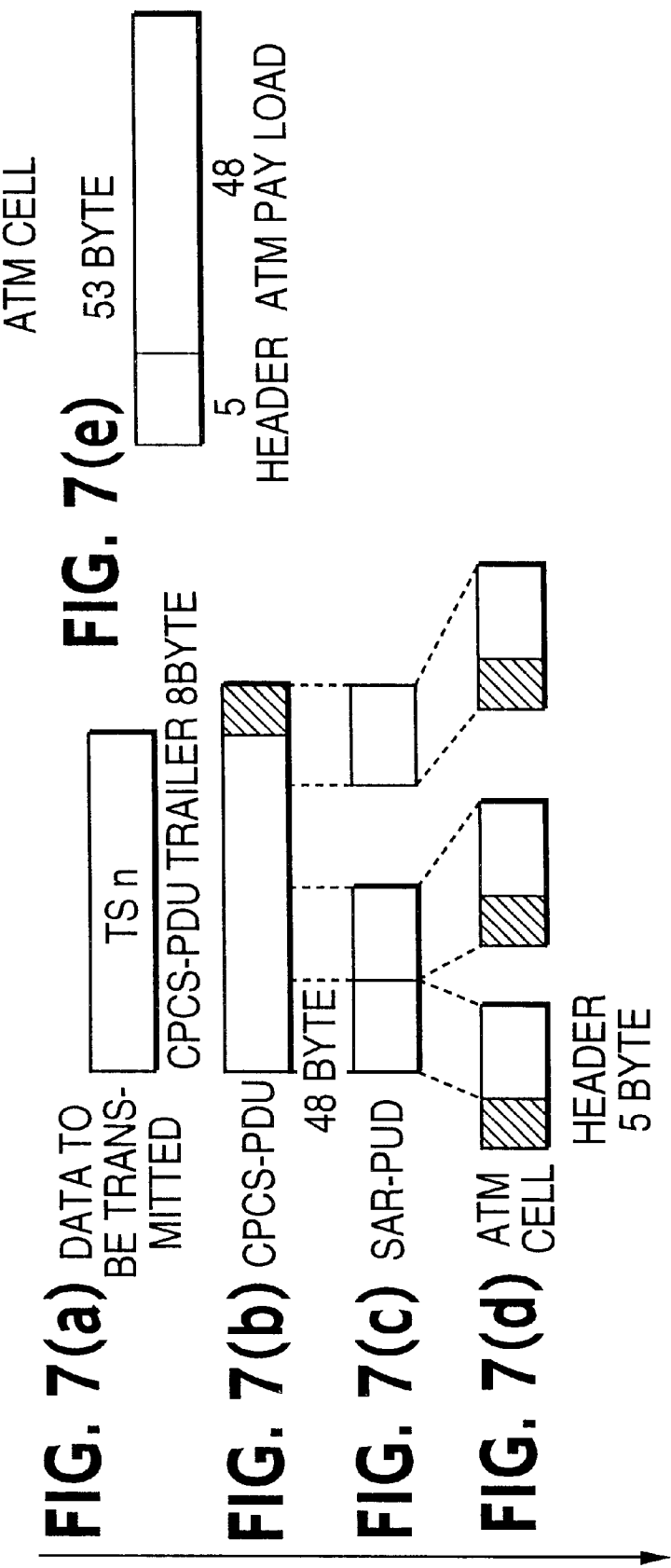

FIG. 8

| | SC | SR | n | A/(B-A) | TS RATE | DEADLINE |
|---|---|---|---|---|---|---|
| 1 | 16 | 84 | 1972 | 608 | 5.5952 | 530.0736 |
| BASE | 16 | 76 | 2176 | 0 | 6.1842 | 529.2032 |
| | SC | SR | n | A/(B-A) | TS RATE | DEADLINE |
| 1 | 16 | 84 | 1976 | 272 | 5.5952 | 531.1488 |
| BASE | 16 | 76 | 2176 | 0 | 6.1842 | 529.2032 |
| | SC | SR | n | A/(B-A) | TS RATE | DEADLINE |
| 1 | 16 | 85 | 1946 | 4864 | 5.5294 | 529.312 |
| BASE | 16 | 76 | 2176 | 0 | 6.1842 | 529.2032 |
| | SC | SR | n | A/(B-A) | TS RATE | DEADLINE |
| 1 | 16 | 85 | 1952 | 304 | 5.5294 | 530.944 |
| BASE | 16 | 76 | 2176 | 0 | 6.1842 | 529.2032 |
| | SC | SR | n | A/(B-A) | TS RATE | DEADLINE |
| 1 | 16 | 85 | 1976 | 64 | 5.5294 | 537.472 |
| BASE | 16 | 76 | 2176 | 0 | 6.1842 | 529.2032 |
| | SC | SR | n | A/(B-A) | TS RATE | DEADLINE |
| 1 | 16 | 85 | 2048 | 19 | 5.5294 | 557.056 |
| BASE | 16 | 76 | 2176 | 0 | 6.1842 | 529.2032 |
| | SC | SR | n | A/(B-A) | TS RATE | DEADLINE |
| 1 | 16 | 86 | 1938 | 128 | 5.4651 | 533.3376 |
| BASE | 16 | 76 | 2176 | 0 | 6.1842 | 529.2032 |
| | SC | SR | n | A/(B-A) | TS RATE | DEADLINE |
| 1 | 16 | 87 | 1904 | 608 | 5.4023 | 530.0736 |
| BASE | 16 | 76 | 2176 | 0 | 6.1842 | 529.2032 |
| | SC | SR | n | A/(B-A) | TS RATE | DEADLINE |
| 1 | 16 | 88 | 1880 | 2584 | 5.3409 | 529.408 |
| BASE | 16 | 76 | 2176 | 0 | 6.1842 | 529.2032 |
| | SC | SR | n | A/(B-A) | TS RATE | DEADLINE |
| 1 | 16 | 88 | 1904 | 76 | 5.3409 | 536.1664 |
| BASE | 16 | 76 | 2176 | 0 | 6.1842 | 529.2032 |
| | SC | SR | n | A/(B-A) | TS RATE | DEADLINE |
| 1 | 16 | 88 | 1938 | 32 | 5.3409 | 545.7408 |
| BASE | 16 | 76 | 2176 | 0 | 6.1842 | 529.2032 |
| | SC | SR | n | A/(B-A) | TS RATE | DEADLINE |
| 1 | 16 | 91 | 1824 | 272 | 5.1648 | 531.1488 |
| BASE | 16 | 76 | 2176 | 0 | 6.1842 | 529.2032 |

McCann et al.

METHOD FOR CONTROLLING DISK MEMORY DEVICES FOR USE IN VIDEO ON DEMAND SYSTEM

BACKGROUND OF THE INVENTION

1. Field of the Invention

The present invention relates to a method for controlling disk memory devices used in a VOD (Video On Demand) system, and in particular, it relates to a method for controlling storing to and reading out from the disk memory devices, data contents such as video programs.

2. Description of the Related Art

As one of symbolical products relating to the multimedia technology, a VOD (Video On Demand) system has been developed. The VOD system may offer services to a lot of users, and each service may be selected by an individual user from various services such as movies, news and shopping information.

It is inevitable that such the services offered through the VOD system will deeply infiltrate into various markets such as homes, enterprises and educational organization in the future, and the services may be transmitted through optical communication media such as CATV and B-ISDN (Broadband-Integrated Service & Digital Network).

FIG. 9 indicates an outline of a multimedia server, which has been developed by the present inventors.

A plurality of data stream servers #1–#n are commonly controlled by a higher ranked server 2. Each of the plurality of the data stream servers #1–#n has a plurality of multimedia stream adapters (hereafter, abbreviated as MSA), for instance, three multimedia stream adapters #01–#903. A plurality of disk memory devices or hard disk units H10–H13 are connected to MSA #01, and hard disk units H20–H23 are connected to MSA #02. In addition, a plurality of hard disk units H30–H33 are connected to MSA #03.

Data read out from the hard disk units H10–H33 corresponding to MSA #01–#03 are converted into ATM (Asynchronous Transfer Mode) cells, and are sent to users, who have sent demands or requests for sending the data via the ATM transmission line 1. The data are usually compressed according to a standard of MPEG (Motion Picture Expert Group) 2 for instance.

Here, the striping technology has been employed to efficiently control disk memory devices used in a VOD system. The striping technology may prevent a disk memory device from being occupied, when data of a program are sent to a user sending a demand or request for the program. One data content, that is, data of a program is stored across two or more disk memory devices according to the striping technology.

On the other hand, program data are sent off to the ATM transmission line 1, at a constant speed. For this, a buffer memory is employed, and it is necessary to read out the following sending data from the buffer memory before the buffer memory becomes empty to keep transmitting the program data without intermission.

A capacity of the buffer memory is called as a single buffer in the case that reading out data is performed one time for one user, and further, it is called as a double buffer for two times of the capacity.

Ideally, it is necessary to read out the program data for each requesting user at constant intervals as shown in FIG. 10. That is, in FIG. 10, D1–D5 show series of read-out time slots allotted respectively for five disk memory devices as an example.

Only read-out data sent off to one user for one time slot must be present on a bus 3 of SCSI-II, for instance to avoid data collision when two or more disk memory devices are connected to the bus 3, as shown in FIG. 9. Series of time slots 1–11 are shifted in time as shown in FIG. 10, so that it is possible to assign the time slots to 11 users at once.

When a user sends a request for sending data of a program, a time slot is allocated at a proper timing position corresponding to a disk memory device, in which the first data for the program requested is stored, and then, the data of the program are read out and sent in order beginning from the allocated time slot.

In FIG. 10, the sixth time slot is allocated as a time slot, from which data A1, A2 . . . of a program A requested by the user A is begun to send to the user A. In the same way, the eighth time slot is allocated for starting sending data B1, B2 . . . of a program B which the user B has requested to send.

Therefore, the program data requested by the user A are read out and transmitted to the user A, from one by one of the different disk memory devices for every sixth time slot. Similarly, the program data requested by the user B are read out and transmitted to the user B from one by one of the different disk memory devices for every eighth time slot.

Separately stored data A1, A2 . . . of the program A, which the user A requested to send are read out from disk memory devices D1, D2 . . . at each time of sixth time slots as shown as RD of FIG. 10. Moreover, separately stored data B1 and B2 . . . of the program data B are similarly read out from the disk memory devices D1, D2 . . . at each time of eighth time slots.

The reading interval time T, that is, a period of deadline is assigned for each program data, and it is necessary that a next separately stored data following the output of the previous separately stored data is read out and sent off within such the deadline period.

FIG. 10 shows an example of reading out the program data A and B with a same bit rate. Deadline periods A–T and B–T respectively assigned to the program data A and B are of the same length. In addition, in the example of FIG. 10, both the separately stored program data A1, A2. . . and B1, B2 . . . are read out within the deadline periods A–T and B–T without delay, respectively.

Here, in a conventional system, a timing of reading out next separately stored data following the previously read out, separately stored data has been controlled, based on an amount of data consumption in the buffer memory.

However, the timing of reading out might be actually delayed. The delay may occur due to no controlling of the timing of reading out at the beginning of service. FIG. 11 shows the case where the timing of reading out is delayed.

FIG. 11 (1) shows an example similar to that in FIG. 10, and in the example, the case where deadline times A–T and B–T, during which the program data A and B must be respectively sent off, are the same, but actual reading intervals are different. Separately stored data A1, A2 . . . of the program data A are accurately read out within the deadline period A–T.

On the other hand, the deadline period assigned to the program data B is B–T. Moreover, FIG. 11(2) shows a buffering amount in the buffer memory during reading out the program data B.

As explained above, the data read out from disk memory devices are stored in a buffer memory once and are read out one by one from the buffer memory. Therefore, when the buffering amount of the data stored in the buffer memory becomes 0, the data cannot be sent off, and in result, a picture image is intermitted.

In FIG. 11, when performing a service of sending the program data at the timing "a" is begun for the user B, the separately stored data B1 of the program data B are read out, after reading out the separately stored data A1 of the program A for the user A.

However, since it is not performed to actually control the timing of reading out the stored data, the case may occur where the deadline period B–T cannot be maintained in the following reading of the stored data B.

It is now considered the case where an empty time slot 7 exists between time slots 6 and 8, and a different user C has sent a request for sending the program data having a reading head in the disk memory device D3, before the separately stored data B2 are read out.

The timing "b" in FIG. 11 should be assigned for reading out the separately stored data B2 corresponding to the deadline B–T. However, the separately stored data C1 of the program data C will be previously read out for the user C, when there is a reading request for sending the program corresponding to the time slot 7 from the user C, before the timing of reading out the separately stored data B2. Therefore, after reading out the separately stored data C1, the separately stored data B2 will be read out and then should be delayed.

On the other hand, the buffering data stored in the buffer memory for the user B is consumed one by one for the period T1 until the following separately stored data are read out, and then, the buffering amount in the buffer memory reaches to 0.

Therefore, the buffering amount is already 0 at the timing "b", and the separately stored data B2 cannot be read out, since the separately stored data C1 of the program data C are previously read out for the user C. As a result, the picture image of the program data for the user B may be intermitted.

Therefore, a double buffering method has been employed in a conventional system, so that an extra buffer memory is assigned for each user to secure at least playing back data corresponding to a maximum delay, for instance, of extra data read out for one reading out time, and then the secured data are sent off to the user.

FIG. 12 is a diagram explaining a conventional system employing the double buffering method. FIG. 12 (1) is similar to FIG. 11 (1), and only difference is that a buffering amount of the buffer memory is two times of that in the case of FIG. 11 as shown in FIG. 12 (2).

A reading out size corresponds to one buffering amount at the timing "a", and then, the separately stored data B1 is written in the buffer memory at the timing "a". When the separately stored data B1 are written in the buffer memory, the buffering amount becomes to correspond to buffering data of two times, and then, the two buffering data of two times will be consumed one by one.

Moreover, timing of reading out the separately stored data B2 for the user B at the timing "b" is delayed by τ, because of reading out the separately stored data C1 for the user C as explained in FIG. 11.

However, the buffering amount becomes the reading out size BS or less, but the buffering amount for the user B is still not 0, yet. Therefore, the picture image is prevented from being intermitted, even if the separately stored data B2 are read out from the buffer memory after the delay time τ.

On the other hand, data streams having a same playing back rate have been stored in a group of disk memory devices which one MSA may control. In general, since contents of programs such as movies are offered by various enterprises, bit rates for the program data streams are not always same. However, it has been possible that two or more disk memory devices which one MSA may control can store only data streams having a same playing back bit rate.

SUMMARY OF THE INVENTION

There has been a draw-back in the double buffering method, because data cannot be sent off until reading out the following data is started, even if the data have been read out to be written in the buffer memory once at the timing of a service starting. Moreover, response time until the service is started has not been preferable or acceptable in a conventional system employing the double buffering method.

In addition, the double buffering method requires two times in the buffering size of a memory, as compared with a case that a single buffer memory is employed, and therefore, the number of users which can be served decreases due to a limited, fixed capacity of the buffer memory.

On the other hand, it has been necessary to store the program data having different transferring speeds respectively in different disk memory devices, which are controlled by different NMSAs, and this would bring extreme inefficiency as regard to operation of the MSAs.

For instance, when the system is expanded by increasing disk memory devices, if the playing back rate for one program data is different from that for another program data, it is necessary to increase the number of disk memory devices along with each corresponding MSA which controls the increased disk memory devices.

Therefore, the purpose of the present invention is to provide a disk memory controlling method, by which the delay caused in time intervals of reading when a single buffer is employed may be avoided, and the number of users who can be served program data may not decrease.

A disk memory controlling system according to the present invention is to control disk memory devices for use in a Video On Demand system which transmits to a user via a buffer memory, data read out in order from the disk memory devices, each of which is assigned a time slot, and the system may includes a plurality of disk memory devices, each of which is assigned a time slot to store separately divided data of a program; a buffer memory for storing data read out from the plurality of disk memory devices; and a controller for counting an estimated period equivalent to a period during which a transmission bus connected to the disk memory devices to be occupied for reading out data for the "i"th time slot, when the "i"th time slot is assigned to no user, while the "i+1"th time slot is assigned to a user; and controlling to read out from the disk memory devices, data for the "i+1"th time slot, after the estimated period has passed.

BRIEF DESCRIPTION OF THE DRAWINGS

FIG. 7(a) to FIG. 7(e) are diagrams explaining the relation between TS of MPEG and ATM cells.

FIG. 8 is a part of the result of calculating streams which can coexistence in the case of TXCLK=50 ns (20 MHz) for the operation speed of ALC.

DESCRIPTION OF THE PREFERRED EMBODIMENT

Figure 1:
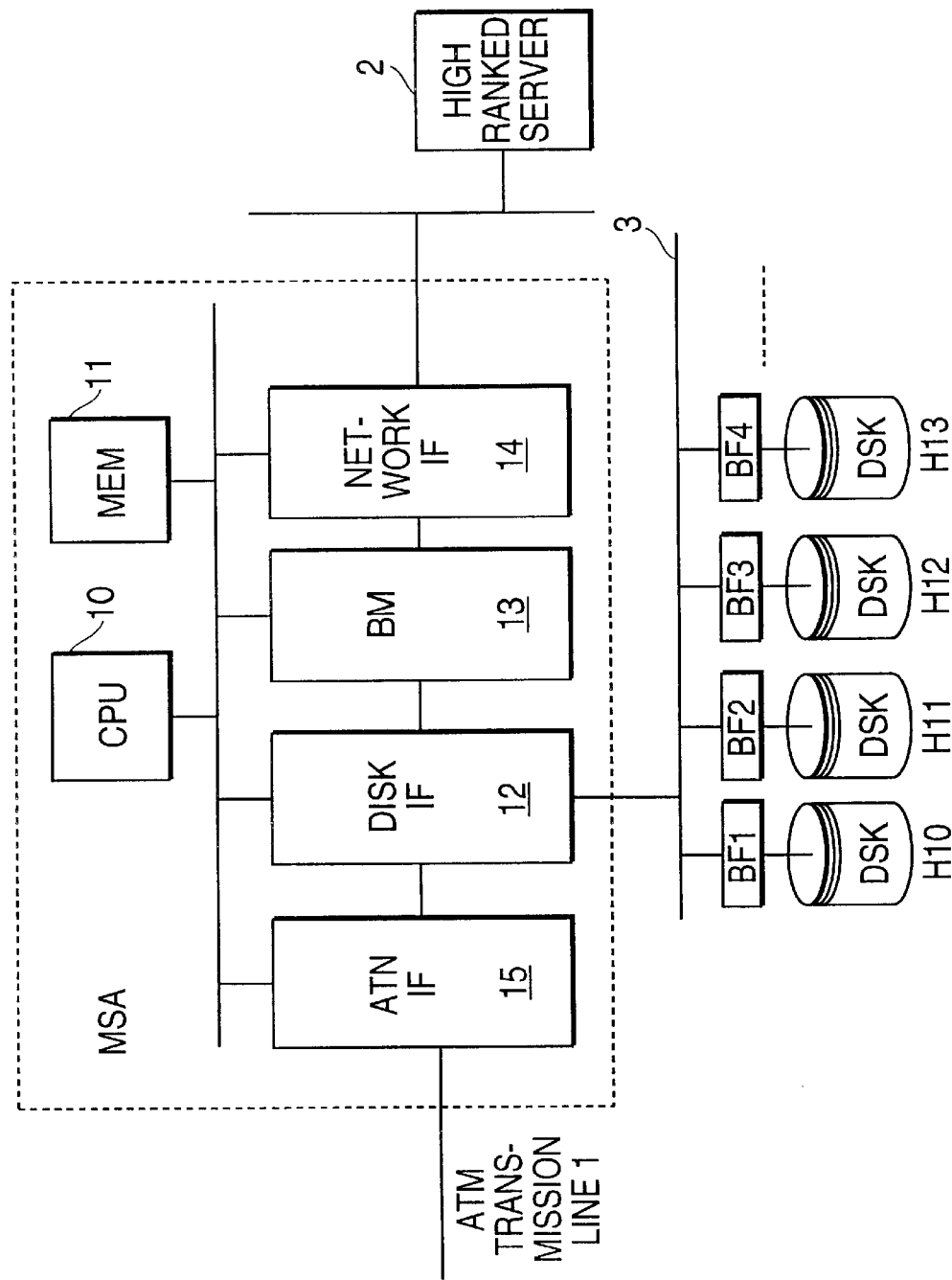
FIG. 1 is a block diagram explaining an embodiment of a multimedia server system employing the present invention.

Embodiments of the present invention will now be explained, as referring to drawings. The same reference number or reference sign is employed to denote the same or similar portions in the drawings.

FIG. 1 is an embodiment of a MSA (multimedia stream adapter) employing a disk memory control method according to the present invention. In FIG. 1, the part enclosed with a broken line is the MSA, and the MSA includes a CPU10, a main memory 11, a disk interface circuit 12, a buffer memory 13, a network interface circuit 14 and an ATM interface circuit 15.

Figure 9:
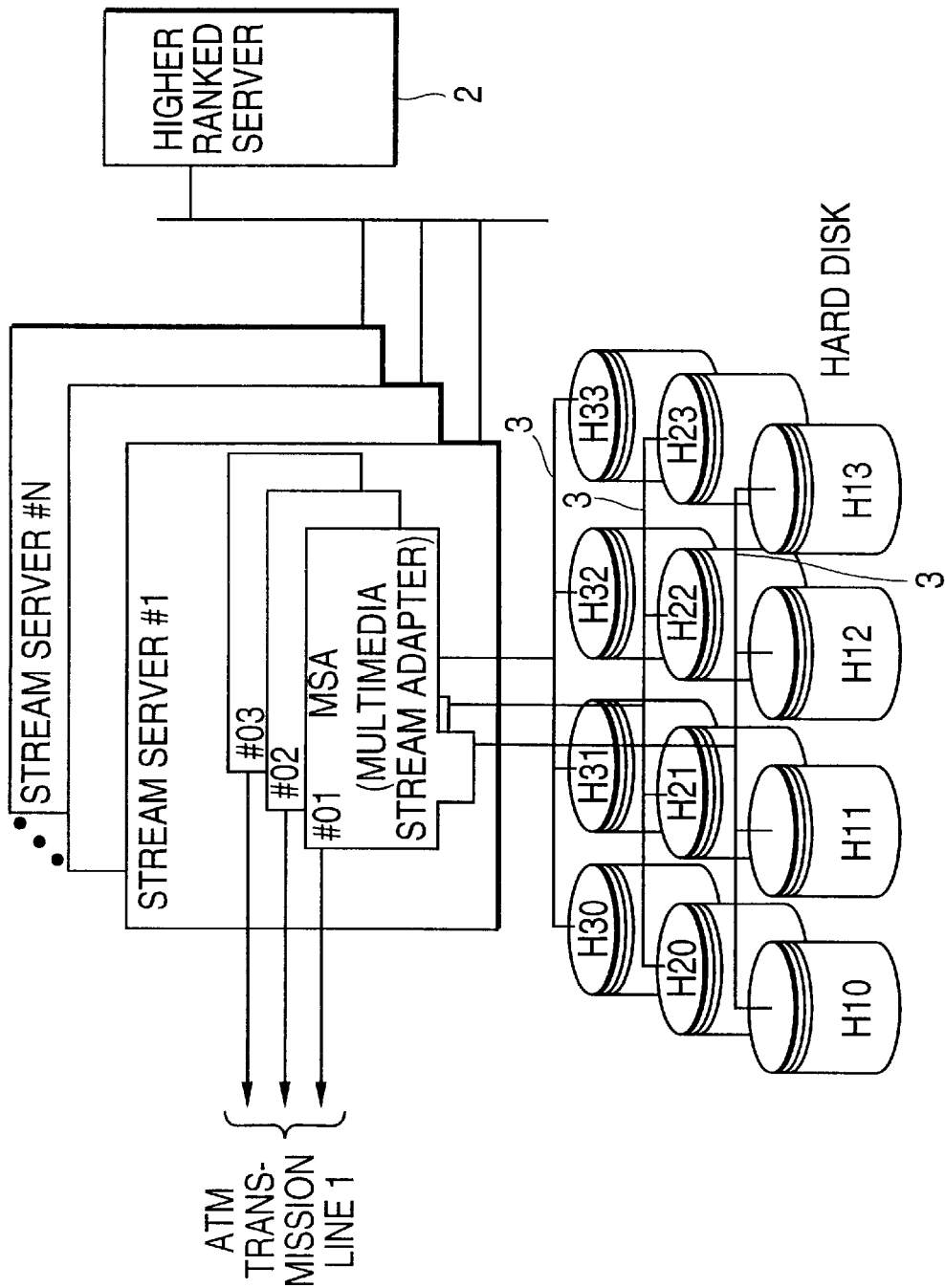
FIG. 9 is an outline of a multimedia server, which has been developed by the present inventors of the present invention.

The MSA provides services to requesting users from the ATM interface circuit 15 via the ATM transmission line 1 as explained by FIG. 9. In addition, disk memory devices H10–H13 shown as representative are commonly connected to a bus 3 in FIG. 1. The disk memory devices H10–H13 are respectively via cash memories BF1–BF4 connected to the MSA for the speed-up of the processing.

In the configuration of the MSA as explained above, the control program performing the disk memory control method according to the present invention by the CPU10 is stored in the main memory 11.

The buffer memory 13 performs buffering of MPEG data read out from the disk memory devices H10–H13, and single buffering data are buffered as a unit, that is, amount of data read out and consumed in one time slot.

The disk interface circuit 12 has an interface function with the disk memory devices H10–H13. Moreover, the network interface circuit 14 transmits and receives control instructions from the higher ranked server 2.

Figure 2:
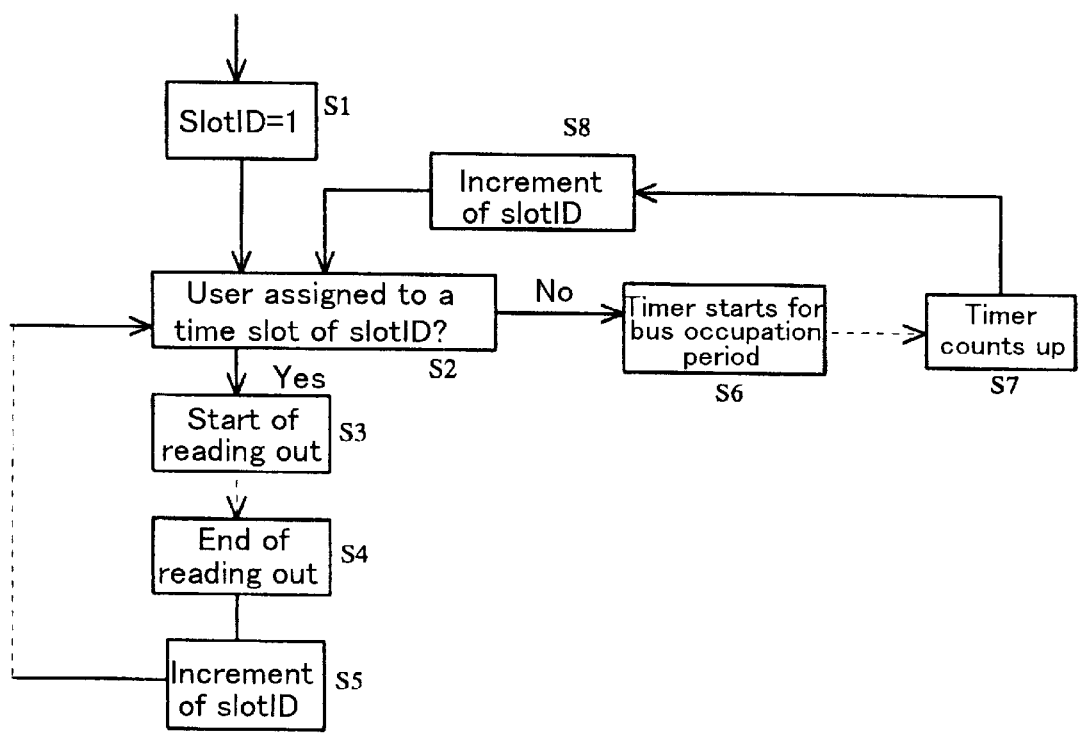
FIG. 2 is an operation flow chart explaining the operation of the first feature of the present invention.

FIG. 2 is an operation flow chart explaining the operation executed in the embodiment of the MSA as explained in FIG. 1, and the operation is executed by the CPUIO according to the program stored in the main memory 11.

Figure 10:
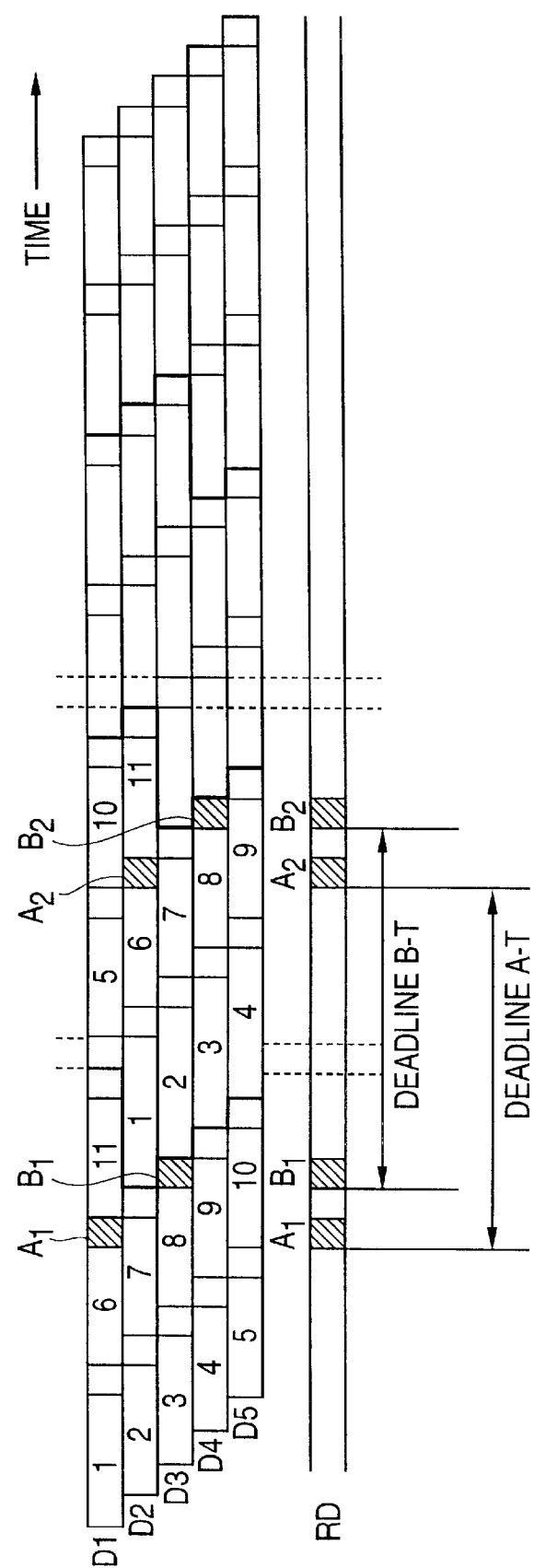
FIG. 10 is a diagram explaining the cause that a fixed reading interval cannot be achieved.

Time slot numbers are allocated within different plural disk memory devices as previously explained in FIG. 10, and the time slot numbers 1 to 11 are allocated in the embodiment of FIG. 10.

Here, the term of time slot refers to operation performed inside of a disk memory device, and means a generic name for a series of accessing processes such as positioning a read head and transmitting data. The time slots allocated in one cycle are cyclically assigned to different disk memory devices.

Figure 11:
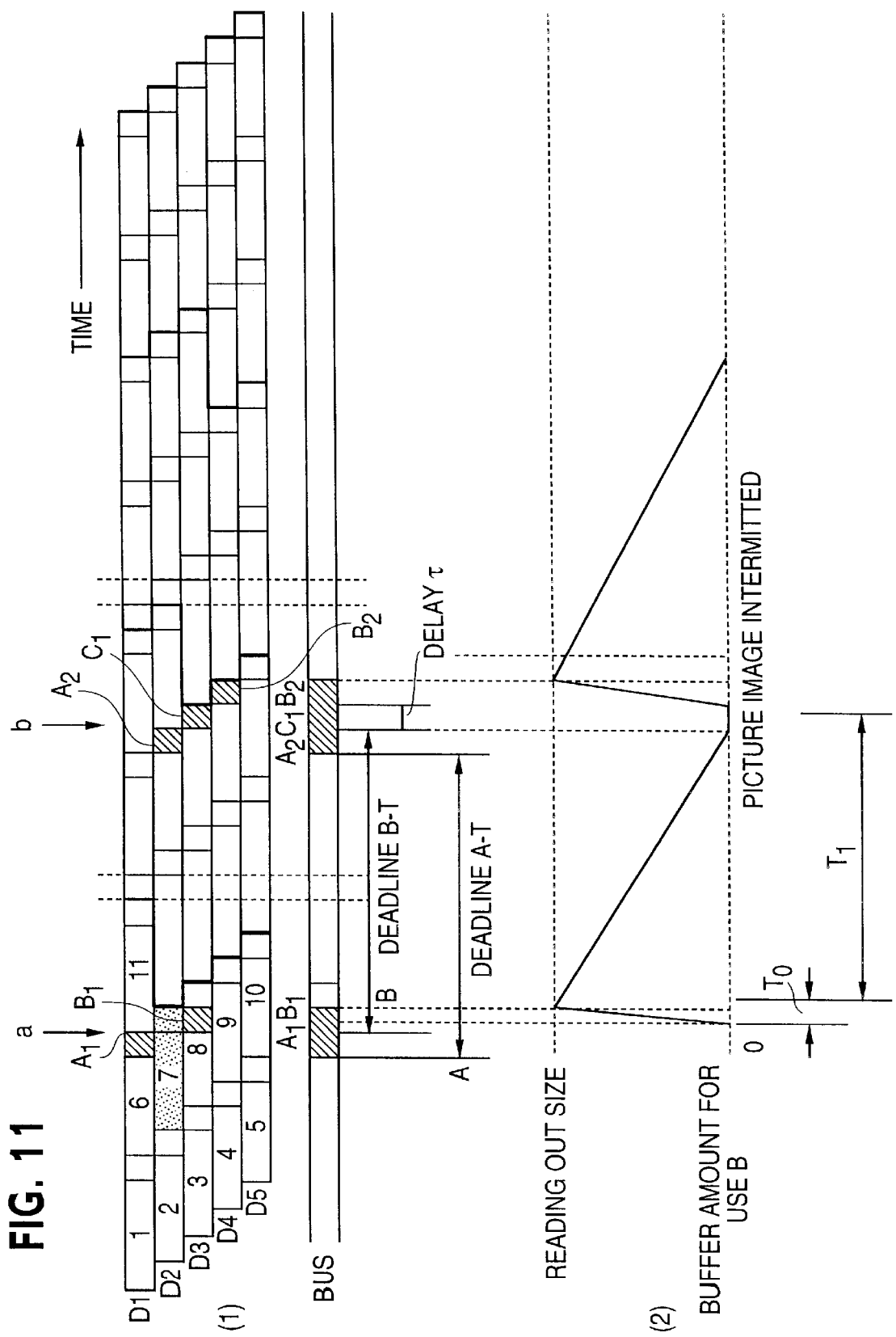
FIG. 11 is a diagram explaining the case where the timing of reading out is delayed.
Figure 12:
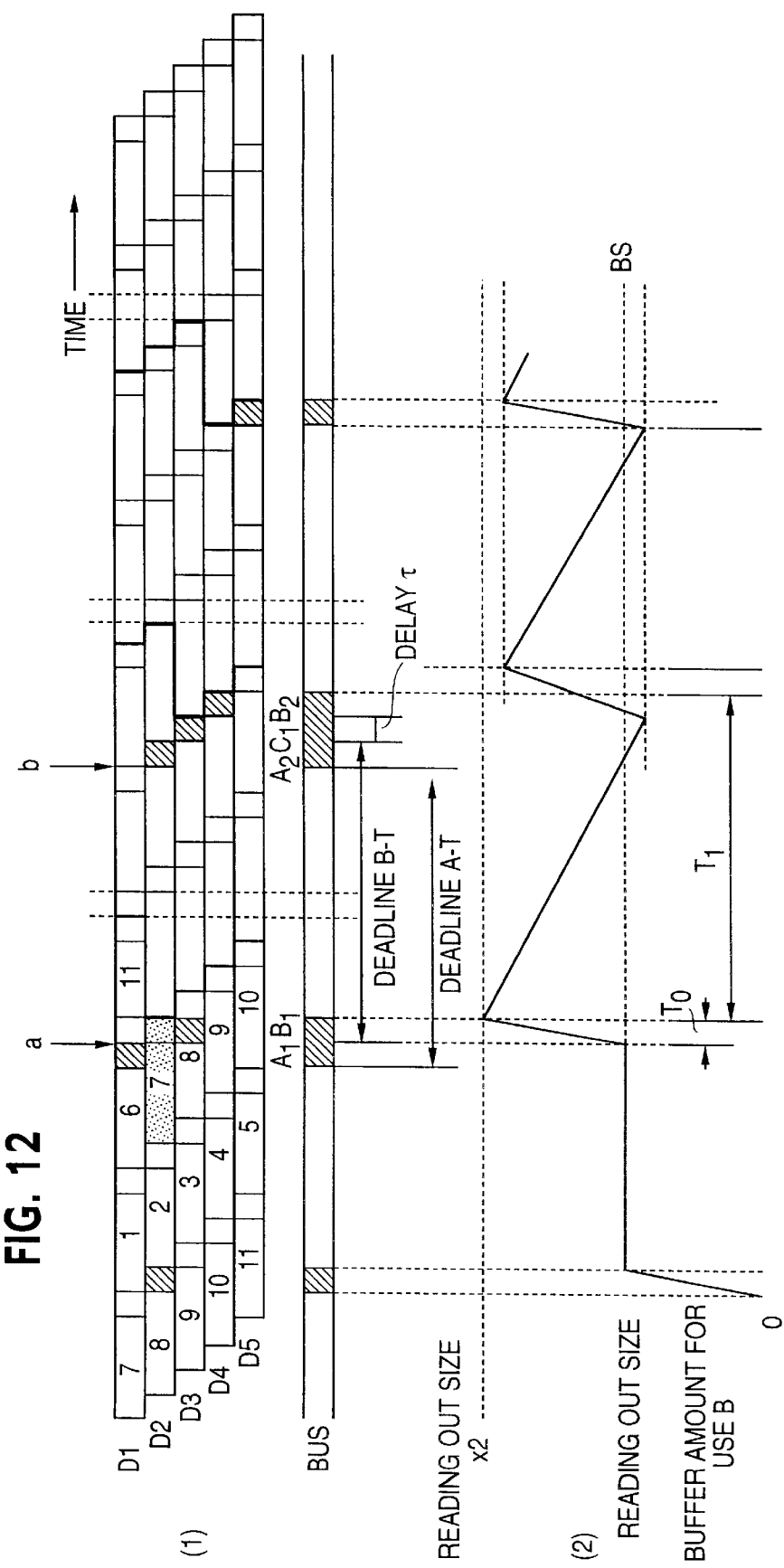
FIG. 12 is a diagram explaining a conventional system employing the double buffering method.

So far, as explained in FIG. 10 to FIG. 12, reading out for the time slot number "i+2" is controlled to immediately follow reading out for the time slot number "i", if users are allocated with the time slot numbers "i" and "i+2", but the time slot number "i+1" is not allocated to any user in a conventional system.

Contrarily, in the present invention, if the time slot "i+1" is not allocated to any user, a timer is actuated or started for an estimated time, for instance, τ (see FIGS. 11, 12), during which the bus 3 may be occupied to transmit data read out in one time slot. The processing for reading out is delayed for the estimated time so that processing is performed as if reading out data for the time slot number "i+1" be performed. As a result, it can be avoided that buffering amount of data becomes 0 and a picture image is intermitted, even if only one buffer memory is used.

Returning to FIG. 2, first of all, the time slot number for the processing is set to "1" (step S1). It is then judged whether or not a user is allocated to the time slot number "1" which is now subject to process (step S2). When no user is allocated, reading out is begun (step S3), and the reading processing is ended (step S4). Then, a time slot number which is subject to process is incremented by "1", and the processing is returned to step S2 (step S5).

On the other hand, in the step S2, the timer is actuated for the estimated time during which the bus 3 may be occupied, when no user is allocated in the time slot number for processing (step S6). The time slot number for processing is incremented by "1", when the timer ends or counts up (step S7), and then, judgment for the step S2 is performed.

Reading out for all user's allocated with time slot numbers can be performed by repeating the above explained processing. Thus, the timer is actuated for a possible bus occupation period when no user is allocated to a time slot number subject to be processed, so that a delay time is given as if the actual reading out operation is performed during the bus occupation period. As a result, even if a time slot is not allocated to any user, the reading timing is not advanced for a following time slot which is allocated to another user.

Figure 3:
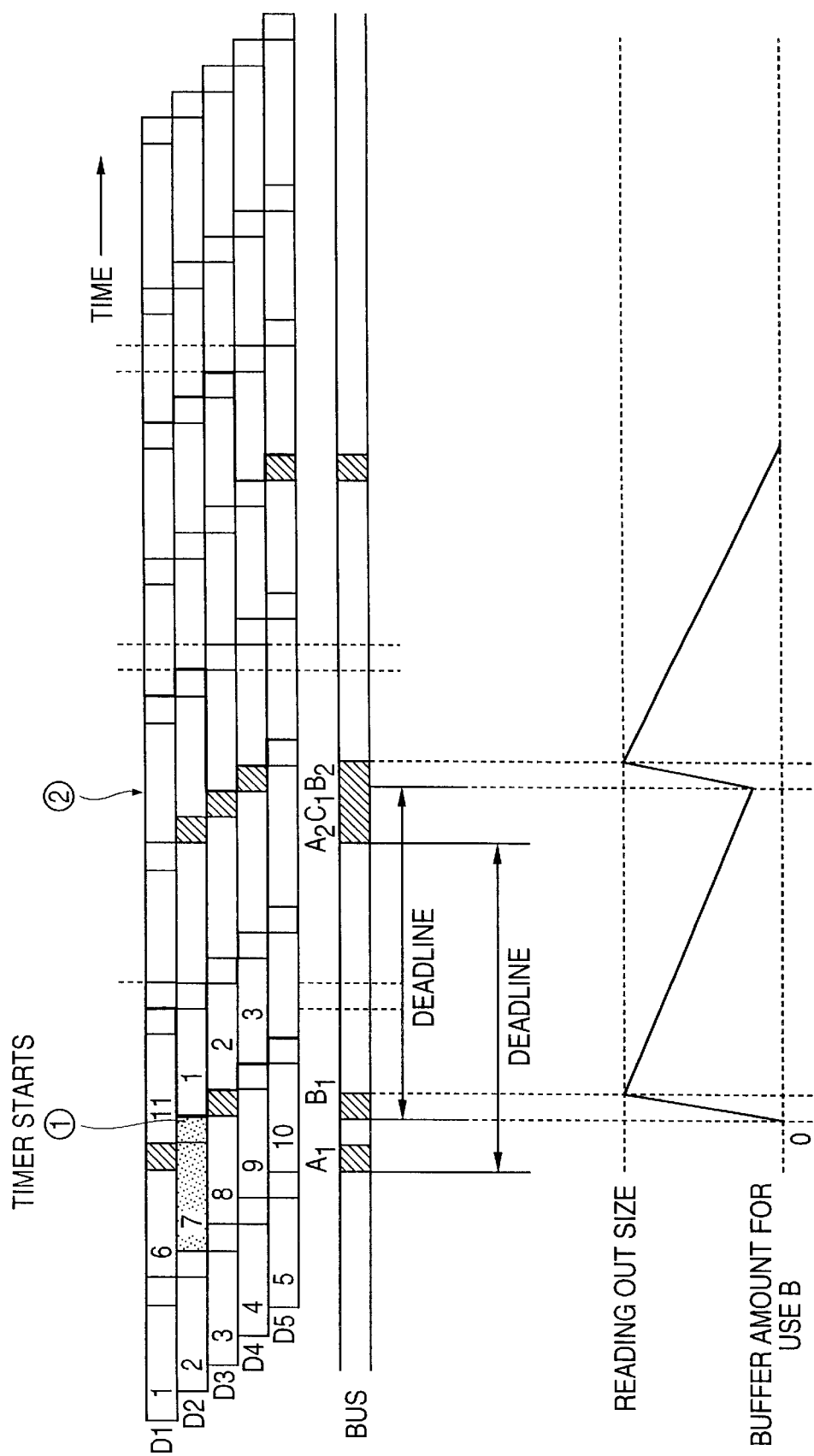
FIG. 3 is a timing chart when the operation flow of FIG. 2 is executed in an embodiment according to present invention.

FIG. 3 is a timing chart in an embodiment executing the operation flow of FIG. 2 according to the present invention correspondingly to FIG. 11. No user is allocated to the time slot number 7 at the timing "a", as shown.

Therefore, in the operation flow of FIG. 2, the time slot 7 is judged whether or not it is allocated to any user at the step S2, and the timer is actuated, if the time slot 7 is judged as not allocated to any user (refer to step S6). As a result, starting time of reading out for the time slot 8 allocated to the user B is delayed by the actuated time period of the timer, as clearly understood when compared with FIG. 1.

Accordingly, the buffering amount of the buffer memory to the user B does not become zero, and thus reading out of picture image data is not intermitted even if a separately stored data C1 for the user C are previously read out, as understood in FIG. 3.

Next, regarding a second problem existing in a conventional system, namely, that an additional MSA is required and efficiency in operation decreases when different bit rates coexist, the present invention solves the problem as explained as follows.

It is now assumed that reading size is xKB, writing speed is 20 MB/s corresponding to a SCSI-II forwarding speed and consumption time is $T_i$ ms for one buffer memory, concerning a data stream $S_i$. Accordingly, the consumption speed for one buffer memory is $x/T_i$ (KB/s), and the deadline is $T_i$ ms when only one buffer memory is used.

First of all, the writing timing in a single buffer only has to be set so that writing is started between ($T_i$-x/r) to $T_i$. from a point when the present data is written in the buffer memory.

Figure 4:
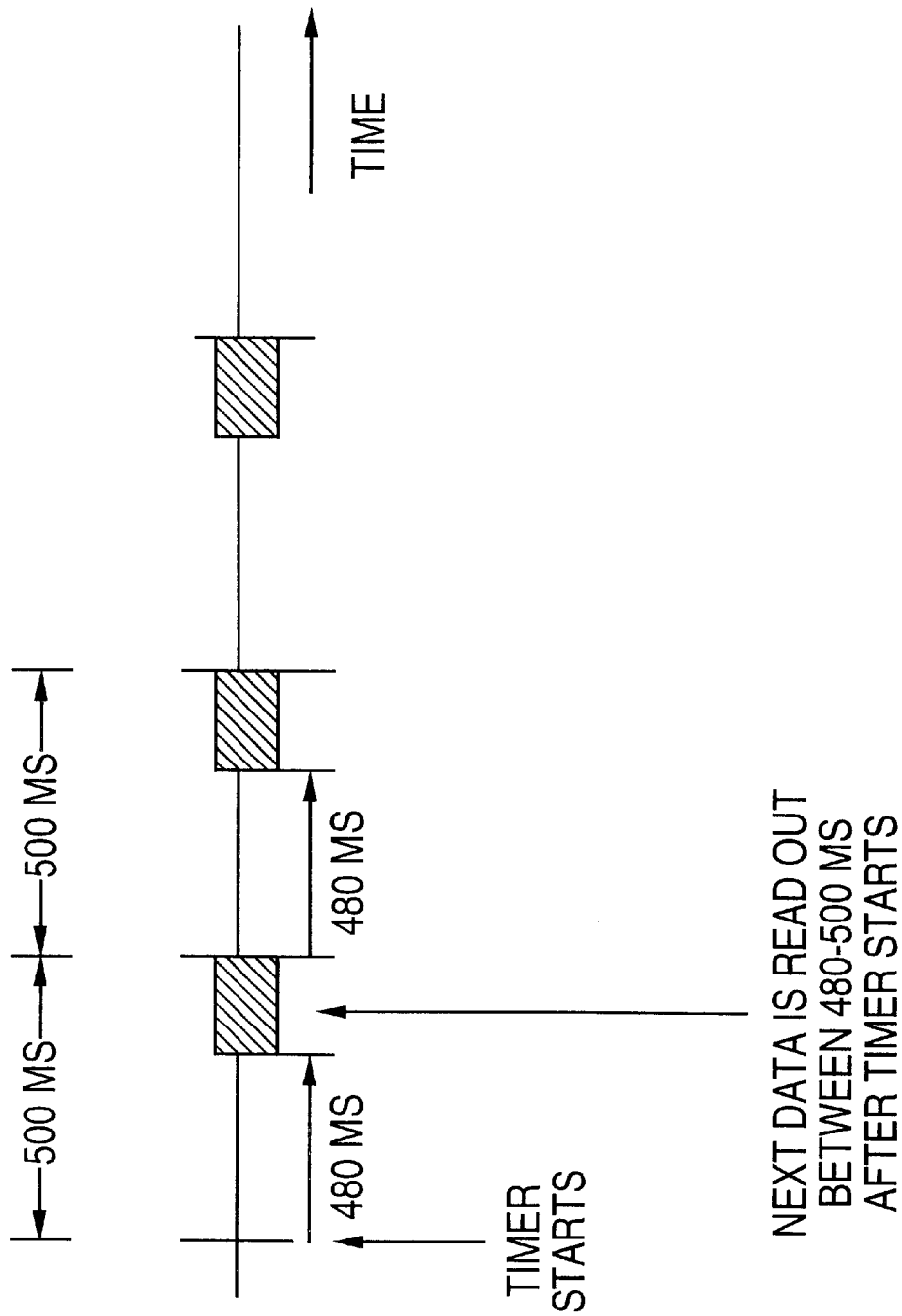
FIG. 4 is a diagram explaining a possible range for reading out when the deadline is 500 ms, and the reading out size is 400 KB.

Namely, the writing timing may start between ($T_i$-x/r) to $T_i$, that is, (500–400/20) to 500 or 480 to 500 ms, after the timer is actuated, when assuming that deadline $T_i$ is 500 ms and reading size is 400 KB, referring to FIG. 4. A data stream which is available to be served with a minimum reading interval, that is, a maximum playing back rate is now considered as $T_{base}$. To store buffering data for xKB means to hold playing back data of $T_i$ ms regarding the data stream $S_i$.

Figure 5:
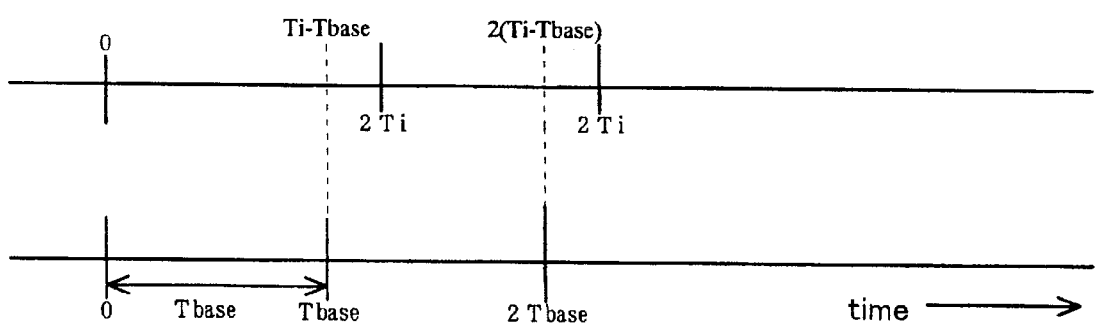
FIG. 5 is a diagram explaining the case of data streams having different deadlines.
Figure 6:
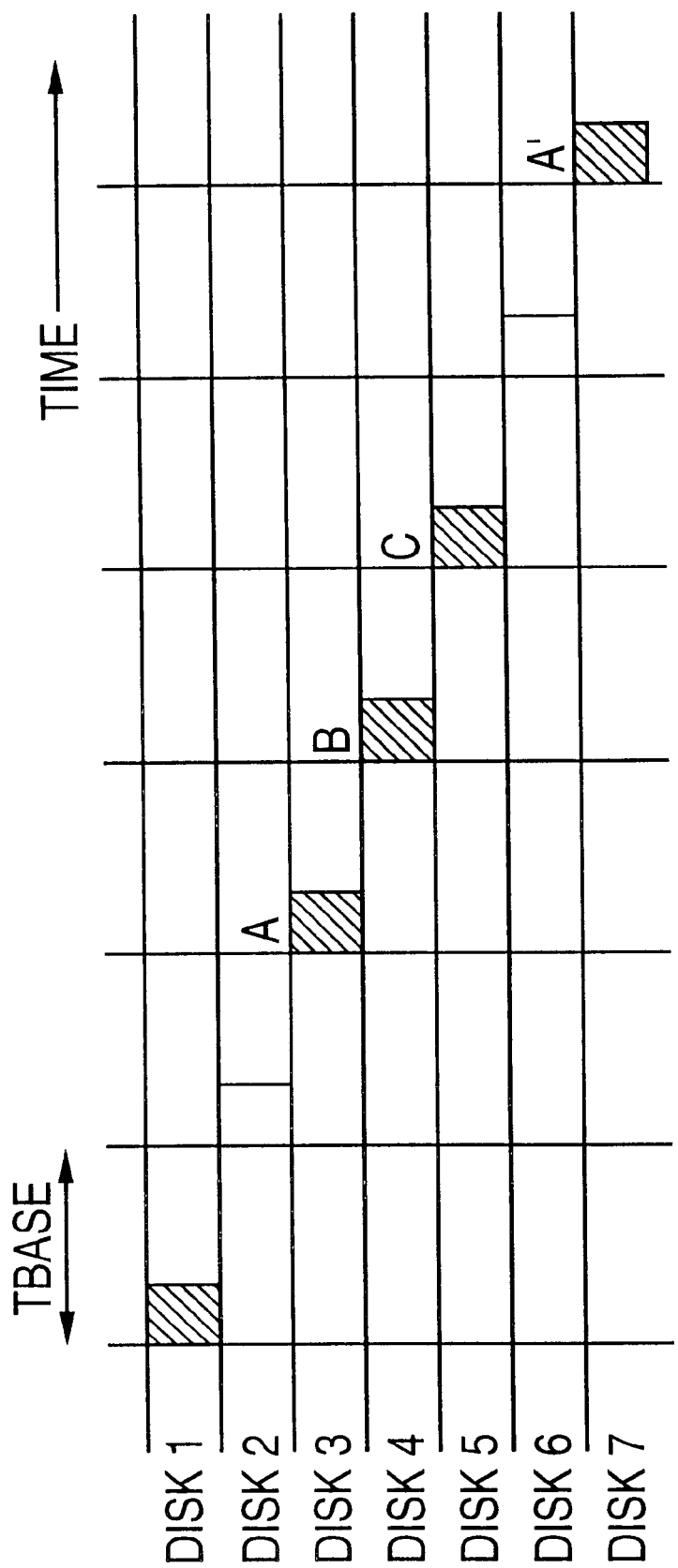
FIG. 6 is a diagram explaining the storing of data streams having different deadlines according to the present invention.

Every time, the data for ($T_i$-$T_{base}$)ms will be accumulated as shown in FIG. 5, if a data stream is read at the minimum reading interval $T_{base}$. Therefore, as shown in FIG. 6, the data are stored beforehand according to the present invention to make an empty time slot when the data gradually accumulated just becomes the amount of the data for the playing back time $T_{base}$.

Thus, data for ($T_i$-$T_{base}$)ms are accumulated in the buffer memory whenever $T_{base}$ passes, and data for "n" expressed by the following expression (1) are continuously read out and then an empty time slot is obtained.

$$n = T_{base}/(T_i - T_{base}) \tag{1}$$

The playing back data gradually accumulated for the time period of $T_{base}$ are
all consumed, so that data streams having different deadlines may coexist.

However, it is necessary to select coexistent data streams by which the expression (1) becomes an integer for this. The present invention therefore, proposes a method for selecting the coexistent data streams by which the expression (1) becomes an integer. The details of the selecting method will now be explained as follows.

Here, the outline of the processing procedure by which a multiplexed data stream of MPEG2 is converted into ATM cells is now explained according to FIG. 7. A data stream to be transmitted is stored in disk memory devices as TS (Transport Stream) packets, which are formed as multiplexed data suitable for communication (refer to FIG. 7(a)).

Therefore, in the process of CPCS (Common Convergence Supplier)–PDU (Protocol Data Unit), that is, the mapping to ATM adaptation layer 5 (AAL5), a CPCS–PDU trailer of 8 bytes is added on the end of the data (refer to FIG. 7(b)). In addition, in the process of SAR (cell division and assembly)–PDU, the data are divided by every 48 bytes (refer to FIG. 7(c)), and then a cell header of five bytes is attached to make an ATM cell (refer to FIG. 7(d)).

Finally, the ATM cell is composed of a header of five bytes and a payload of 48 bytes which is used as user information as shown in FIG. 7(e).

In the above-mentioned, one TS has 188 bytes, and a CPCS–PDU trailer of eight bytes is given to two TSs when conforming to the as DAVIC (Digital Audio Visual Council) standard. At this point, the ATM data to be transmitted become 188*2+8=384 bytes. In the process of SAR–PDU, the ATM data will be divided into eight (=384/48) ATM cells, and a header of five bytes is given to each of the divided ATM cells.

By the way, the bit rate of the ATM cells is decided by the next expression (2).

$$R = 53*8/(TXCLK*SC*SR) \text{ bps} \tag{2}$$

The TXCLK is a clock cycle of ALC (a chip of ATM), SC is a scale value (4 or 16 or 64 or 256) of a counter clock, and SR is a counter value (1~255), which is decided according to a bit rate to be transmitted.

The above expression (2) is to obtain a bit rate of transmitting ATM cells, each having 53 bytes for the TXCLK*SC*SR seconds. In the case of obtaining a transmission bit rate for eight ATM cells, the transmission bit rate R becomes as expressed by the next expression (3).

$$R = 53*8*8/(TXCLK*SC*SR*8) \text{ bps} \tag{3}$$

There are 188*2=384 bytes for TS in 53*8(=(48+5)*8= 384+40=188*2+8+40) bytes. Accordingly, if the portion of 53*8 in the expression (3) is modified, the transmission rate R expressed by the expression (2) is changed to the next expression (4).

$$R' = 376*8/(TXCLK*SC*SR*8) \text{ bps} \tag{4}$$

Thus, when the number of TS stored in the reading size of x KB concerning stream $S_i$ is set to "$n_i$", and the transmission rate of TS is set to $R_i = 376*8/(TXCLK*SC_i*SR_i*8)$ bps, the deadline $T_i$ may be obtained by the next expression (5).

$$T_i = 188 n_i * 8/(R_i * 10^{-6}) \text{ ms} \tag{5}$$

Therefore, possible combination cases of different playing back rates are realized under either of the following conditions.

A first case is that $T_i = T_{base}$, that is, values n, SC and SR which decide a playing back rate of data streams satisfy the next expression.

$$n_i * SC_i * SR_i = n_{base} * SC_{base} * SR_{base}$$

A second case is that "n" in the expression (1) is an integer. That is, values n, SC and SR are determined so that the next expression (6) may become an integer.

$$n_{base} * SC_{base} * SR_{base}/(n_i * SC_i * SR_i - n_{base} * SC_{base} * SR_{base}) \tag{6}$$

FIG. 8 shows a part of the result when the operation speed of ALC is calculated at the case of TXCLK=50 ns (20 MHz).

In each item shown in FIG. 8, the stream of the playing back rate in the upper column can coexist with the playing back rate in the lower column, which is set as a standard stream, and values of n, SC and SR, which decide the playing back rate for each data stream are also shown in FIG. 8. For instance, the stream of 6.1842 Mbps under the condition that SC is 16, SR is 76, and n is 2176 may be commonly stored and served with the stream of 5.3409 Mbps under the condition that SC is 16, SR is 88, and n is 1880.

Moreover, it is shown that data streams should be continuously stored for A/(B–A)(=2584), so that one time slot is spaced. In this calculation result, more than 10 kinds of streams such as 5.3409 Mbps, 5.8750Mbps and 4.8958 Mbps, 3.6716 Mbps my be commonly stored and served together with the stream of 6.1842 Mbps, although the streams of 5.8750 Mbps, 4.8958 Mbps and 3.6716 Mbps are not shown in FIG. 8.

As explained above, according to the embodiments of the present invention, it is possible to keep a constant interval for reading out data from a single buffer memory. Thus, the present invention may offer the system in which the number of maximum services can be readily secured In addition, the present invention will make it possible to send a plurality of data streams having different bit rates from a same MSA, and as a result, efficiency in the multimedia server operation may be improved.

What is claimed is:

1. A Video On Demand system sending data to requesting terminals, comprising:

a plurality of disk memory devices coupled to a bus, each of which is allocated time slots to sequentially store divided data of a program;

a buffer memory storing data read out from the plurality of disk memory devices and reading out the stored data to be sent to the requesting terminals;

a controller, coupled to the buffer memory, controlling to start counting a period during which the bus is occupied for one time slot, if the "i+1"th time slot is assigned to no user, but the "i+2"th time slot is assigned to a user, and controlling to read out data for the "i+2"th time slot from the buffer memory, so as to follow reading out of data for the "i"th time slot, after the period is counted up; and an interface circuit, coupled to the buffer memory, to the controller, and to the requesting terminals, sending the read out data to the requesting terminals.

2. A method for controlling disk memory devices for use in a Video On Demand System including a plurality of disk memory devices, each of which is allocated time slots to sequentially store divided data of a program, and a buffer memory which stores data read out from the plurality of disk memory devices in order of time slot numbers to send a requesting user, the method comprising the steps of:

determining whether an "i+1"th time slot number allocated to a disk memory device is assigned to a user;

if the "i+1"th time slot number is assigned to the user, reading out data stored in the buffer memory, incrementing the time slot number by one and returning to the step of determining;

actuating a timer that counts a period during which a bus connected to the disk memory devices is occupied if the time slot number is not assigned to any user for the "i+1"th time slot number;

incrementing the "i+1"th time slot number to the "i+2"th time slot number after the timer counts up; and reading out data for the "i+2"th time slot number from the buffer memory to follow data for the "i"th time slot number.

3. The method for controlling disk memory devices according to claim 2, wherein said buffer memory has a buffering size for storing data read out one time for one user.

4. The method for controlling disk memory devices according to claim 2, wherein the plurality of disk memory devices store data having different playing back rates, so that in the step of reading out, data having a readout interval of Ti, are read out, based on $T_{base}$, which is the minimum read out interval, and when data for $(Ti-T_{base})$ accumulated whenever reading out reach to the minimum read out interval $T_{base}$, an ample time slot is formed.

5. A method for controlling disk memory devices for use in a Video On Demand system including a plurality of disk memory devices, each of which is allocated a time slot to store separately divided data of a program, and a buffer memory which stores data read out from the plurality of disk memory devices in the order of time slot numbers to send a corresponding user, the method comprising the steps of:

storing data having different playing back rates in the plurality of disk memory devices;

reading out data having a readout interval of Ti, based on $T_{base}$, which is the minimum read out interval;

storing data for $(Ti-T_{base})$ in the buffer memory, whenever $T_{base}$ passes;

reading out data for $n=T_{base}/(Ti-T_{base})$ so that an ample time slot is obtained; and sending playing back data for $T_{base}$, which are accumulated during the ample time slot.

6. The method for controlling disk memory devices according to claim 5 wherein data having different playing back rates coexist in the data stored in the plurality of disk memory devices so that said $n=T_{base}/(Ti-T_{base})$ becomes integer.

* * * * *

UNITED STATES PATENT AND TRADEMARK OFFICE
CERTIFICATE OF CORRECTION

PATENT NO.: 6,115,786
DATED : September 5, 2000
INVENTOR(S): Masami MIZUTANI

It is certified that an error appears in the above-identified patent and that said Letters Patent is hereby corrected as shown below:

Col. 9, line 9, after "terminals" insert --, said buffer memory including a buffering size for storing data read out in one time slot for one user--.

Signed and Sealed this

Twenty-fourth Day of April, 2001

Attest:

NICHOLAS P. GODICI

*Attesting Officer*     *Acting Director of the United States Patent and Trademark Office*